United States Patent
Steele, III et al.

(10) Patent No.: US 11,900,426 B1
(45) Date of Patent: Feb. 13, 2024

(54) APPARATUS AND METHOD FOR PROFILE ASSESSMENT

(71) Applicant: Quick Quack Car Wash Holdings, LLC, Roseville, CA (US)

(72) Inventors: Joseph Allen Steele, III, Plumas Lake, CA (US); Josh David Schumacher, Sacramento, CA (US)

(73) Assignee: Quick Quack Car Wash Holdings, LLC

( * ) Notice: Subject to any disclaimer, the term of this patent is extended or adjusted under 35 U.S.C. 154(b) by 0 days.

(21) Appl. No.: 18/196,371

(22) Filed: May 11, 2023

(51) Int. Cl.
  *G06Q 30/02* (2023.01)
  *G06Q 30/0283* (2023.01)
  *G06Q 30/0207* (2023.01)

(52) U.S. Cl.
  CPC ..... *G06Q 30/0283* (2013.01); *G06Q 30/0239* (2013.01)

(58) Field of Classification Search
  CPC ............... G06Q 30/0283; G06Q 30/0239
  USPC ............................... 705/400, 14.39
  See application file for complete search history.

(56) References Cited

U.S. PATENT DOCUMENTS

| | | | |
|---|---|---|---|
| 11,030,701 B1 * | 6/2021 | Brannan | G06Q 40/08 |
| 11,227,322 B1 | 1/2022 | Vijayan | |
| 2016/0086222 A1 * | 3/2016 | Kurapati | G06Q 40/08 |
| | | | 705/14.53 |
| 2016/0119477 A1 * | 4/2016 | Sharpe | G06Q 30/0261 |
| | | | 379/265.09 |
| 2021/0166322 A1 | 6/2021 | Allen | |

FOREIGN PATENT DOCUMENTS

| | | | | |
|---|---|---|---|---|
| CA | 2985691 C | * | 9/2020 | ......... G06Q 10/0631 |
| CA | 3171252 A1 | * | 9/2021 | ........... G06Q 30/016 |
| WO | WO-2013039573 A2 | * | 3/2013 | ............ G06Q 30/02 |
| WO | 2022/031811 A1 | | 2/2022 | |

OTHER PUBLICATIONS

Gupta, Shiv, "Supercharge Your Sales Funnel With Chatbots", Sep. 20, 2021, incrementors.com, 19 pages. (Year: 2021).*

Dayal, Abhiraj, "How chatbots help businesses to improve customer experience in 2021", Jun. 1, 2021, emplifi.io., 19 pages. (Year: 2021).*

* cited by examiner

*Primary Examiner* — Shannon S Campbell
*Assistant Examiner* — Freda A Nelson
(74) *Attorney, Agent, or Firm* — Caldwell Intellectual Property Law

(57) ABSTRACT

An apparatus and method for profile assessment, the apparatus including at least a processor, and a memory communicatively connected to the processor, the memory containing instructions configuring the processor to receive user data, receive system data, classify the user data to a service type, generate a pecuniary adjustment assessment as a function of the classified user data and system data and output the pecuniary adjustment assessment.

20 Claims, 8 Drawing Sheets

APPARATUS AND METHOD FOR PROFILE ASSESSMENT

FIELD OF THE INVENTION

The present invention generally relates to the field of profile assessment. In particular, the present invention is directed to an apparatus and method for profile assessment.

BACKGROUND

Current methods for classifying user data are insufficient. There is a need for optimizing classification of user data to generate trends and predications based on user data that affect a system.

SUMMARY OF THE DISCLOSURE

In an aspect an apparatus for profile assessment, the apparatus including at least a processor, and a memory communicatively connected to the processor, the memory containing instructions configuring the processor to receive user data, receive system data, classify the user data to a service type, generate a pecuniary adjustment assessment as a function of the classified user data and system data and output the pecuniary adjustment assessment.

In another aspect a method for profile assessment, the method including receiving, by a computing device, user data. receiving, by the computing device, system data, classifying, by the computing device, the user data to a service type, generating, by the computing device, a pecuniary adjustment assessment as a function of the classified user data and system data, and outputting, by the computing device, the pecuniary adjustment assessment.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for user profile assessment. In an embodiment, apparatus and method may be used by clients or perspective clients of a business to gain discounts, coupons, and the like. For example, a user may submit personal data through a user interface, wherein the apparatus may assess if the user qualifies for a price adjustment for a service or good.

Aspects of the present disclosure can be used by a business to evaluate and assess price adjustments for services or goods provided based a plurality of factors, such as economic and client needs. Exemplary embodiments illustrating aspects of the present disclosure are described below in the context of several specific examples.

Figure 1:
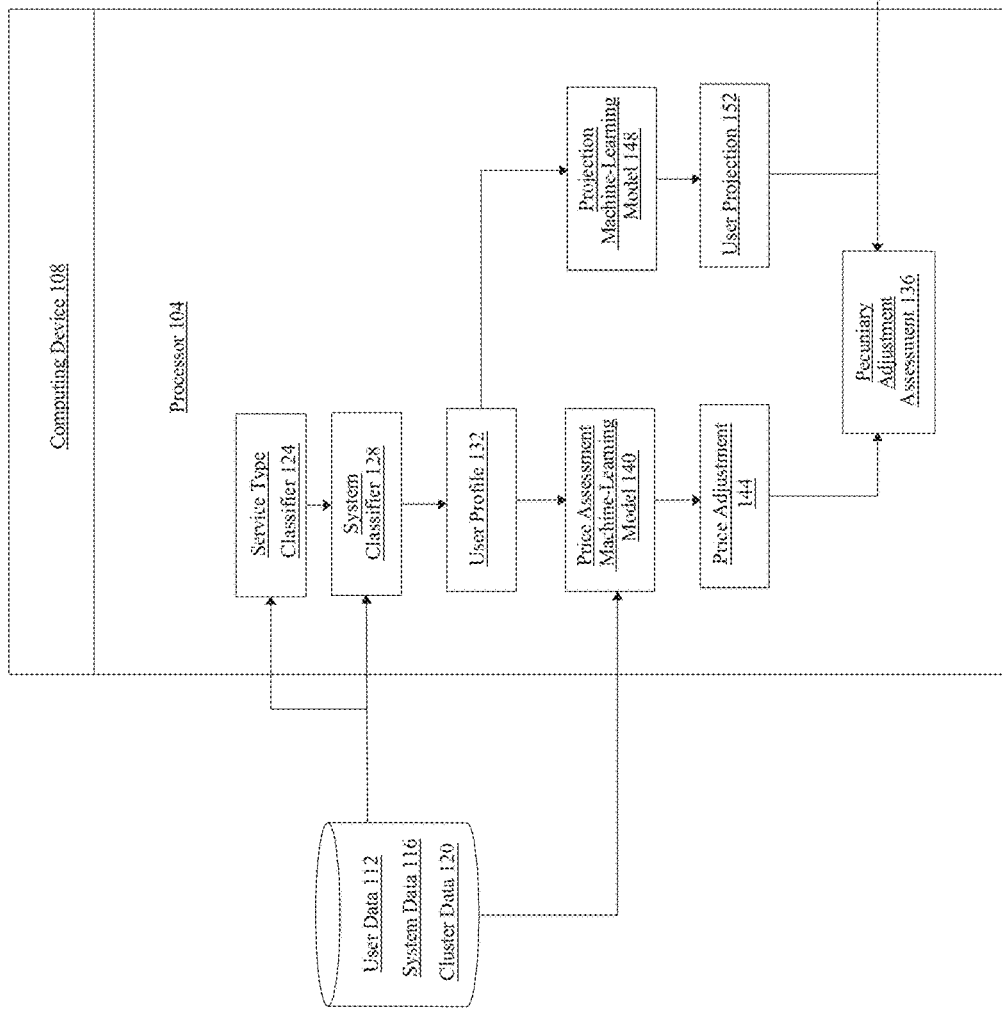
FIG. 1 is a block diagram illustrating an apparatus for profile assessment.

Referring now to FIG. 1, an exemplary embodiment of an apparatus 100 for profile assessment is illustrated. Apparatus 100 includes a processor 104 and a memory communicatively connected to the processor, the memory containing instructions configuring the processor to perform the assessment process. Processor 104 may include, without limitation, any processor described in this disclosure. Processor 104 may be included in a computing device. Computing device 108 may include any computing device as described in this disclosure, including without limitation a microcontroller, microprocessor, digital signal processor (DSP) and/or system on a chip (SoC) as described in this disclosure. Computing device 108 may include, be included in, and/or communicate with a mobile device such as a mobile telephone or smartphone. Computing device 108 may include a single computing device operating independently, or may include two or more computing device operating in concert, in parallel, sequentially or the like; two or more computing devices may be included together in a single computing device or in two or more computing devices. Computing device 108 may interface or communicate with one or more additional devices as described below in further detail via a network interface device. Network interface device may be utilized for connecting computing device 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 108 may include but is not limited to, for example, a computing device or cluster of computing devices in a first location and a second computing device or cluster of computing devices in a second location. Computing device 108 may include one or more computing devices dedicated to data storage, security, distribution of traffic for load balancing, and the like. Computing device 108 may distribute one or more computing tasks as described below across a plurality of computing devices of computing device, which may operate in parallel, in series, redundantly, or in any other manner used for distribution of tasks or memory between computing devices. Computing device 108 may be implemented, as a non-limiting example, using a "shared nothing" architecture.

With continued reference to FIG. 1, computing device 108 may be designed and/or configured to perform any method, method step, or sequence of method steps in any embodiment described in this disclosure, in any order and with any degree of repetition. For instance, Computing device 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 108 is configured to receive user data 112. "User data," as used herein, is information related to a user. A user may be a person, such as a client or customer of a business/shop. User data 112 may be received for one or more users engaged with a business, also referred to as a system in this disclosure. A business may be a car service provider, such as car wash, auto-body shop, and the like. User data 112 may be information obtained from each user that has visited a location, store, shop, and/or event associated with a business. User data 112 may include user's names correlated to services or activities they previously received or participated in. In some embodiments, user data 112 may include an activity record. An "activity record," as used herein, is a data structure containing a user identification related to a service received. A "user identification," as used herein, is data containing information related to the identity of a user. For example, user identification may include the name, vehicle owned by the user, account number a user has at a business, phone number, and/or mailing address of a user. In an example, an activity may be a service previously performed for a client at a car wash, such as car detailing services. In another example, activity may include goods previously sold to a user, such as car air fresheners. User data 112 may include the number of times a user has received one or more services, the number of locations, such as shop chains, a user has visited, the type of events a user has attended, such as grand openings and charity events, and the like. User data 112 may include a user's geolocations. A "geolocation," as used herein, is the geographical location of a person or device. For example, computing device 108 may identify a user's IP address to determine a country, region, state, city and/or postal code associated with the user. User's geolocations may be correlated to shop locations, for example, shop location of a business with a 5-mile radius of a user's geolocation. Shops may include a car wash business, auto parts shop, auto repair shops and the like. A geolocation of a user may be obtained from a radar source, a mobile device, and/or internet connected device location communicatively connected to computing device 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device 108. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A geolocation of a user may include data received from or generated by a global positioning system (GPS) of a user. A geolocation of a user may include geographic coordinates that specify the latitude and longitude of a location where a user currently is located, and/or a location where a user may be located in the future. In an embodiment, a geolocation may specify the location where a user is located at the present moment.

Still referring to FIG. 1, user data 112 may include vehicle data, also referred to as vehicle information, correlated to a user. Vehicle information may include the make, model, color, and history of services performed on a vehicle related to a user. Vehicle information may include manufacturer guides related to frequency for parts replacements, care routine, and the like. In an example, vehicle information may include a history of services performed, damage, accidents, and the like during and/or prior to a user's ownership of the vehicle, history may include reports from private entities such as Carfax reports. In some embodiments, user data 112 may be received from a user database. A "user database," as used herein is data structure populated with user data. Databases, disclosed herein, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, user data 112 may be received from a graphical user interface (GUI). A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. In some embodiments, a user may submit user data 112 through GUI, such as summiting documents or text or audio input of data. In some embodiments, user data 112 may be received through a chatbot utilizing GUI. As used in the current disclosure, a "chatbot" is a computer program designed to simulate conversation with users. A chatbot operating on a GUI may prompt question for a user asking for user data 112.

Still referring to FIG. 1, in some embodiments, user data 112 may be received through a user operated remote device. A "remote device," as used herein is a computing device operated by a third party. A third party may refer to a user or business operating a laptop smartphone, and the like communicatively connected to computing device 108.

Still referring to FIG. 1, computing device 108 is configured to receive system data 116. "System data," as used herein, is information related to a business. A "business," as used herein, is a provider of goods or services. System data 116 may relate to one or more businesses participating in the same or different markets. A "market," as used herein, is an area or a good or service a business engages in. For example, a market may relate to auto service, restaurants, healthcare, and the like. System data 116 may include the type of goods and/or services of business, such as a car wash business. A System data 116 may be the type of wash services or products provided and the correlated price a user is to pay. System data 116 may include one or more geolocations of a business, for example, geolocations may include addresses of each shop belonging to a business.

Still referring to FIG. 1, computing device 108 is configured to receive Cluster data 120. "Cluster data," as used herein, is information related to economics. "Economics," as used herein, is the study of scarcity and its implications for the use of resources, production of goods and services, and growth of production and welfare over time. Cluster data 120 may include publicly available economic information related to a service or product in a particular or general market, such as inflation rates, interest rates, and the like. For example, Cluster data 120 may contain reports from the U.S. Bureau of Labor Statistics that all goods included in the Consumer Price Index Summary increased by 8.5% over the previous year. In some embodiments, computing device 108 may receive economic information utilizing a web crawler. A "web crawler," as used herein, is a program that systematically browses the interne for the purpose of Web indexing. The web crawler may be seeded with platform URLs, wherein the crawler may then visit the next related URL, retrieve the content, index the content, and/or measures the relevance of the content to the topic of interest. In some embodiments, computing device 108 may generate a web crawler to scrape economic information from a plurality of consumer, business, finance, marketplace blogs and reports. The web crawler may be seeded and/or trained with a reputable website, such as bls.gov (U.S. Bureau of Labor Statistics), to begin the search. A web crawler may be generated by a computing device 108. In some embodiments, the web crawler may be trained with information received from a business through a user interface. In some embodiments, the web crawler may be configured to generate a web query. A web query may include search criteria received from a business. For example, a business may submit a plurality of websites for the web crawler to search to financial statistics for a market from and correlate to the financial statistics of the business. Additionally, the web crawler function may be configured to search for and/or detect one or more data patterns. A "data pattern" as used in this disclosure is any repeating forms of information. A data pattern may include repeating financial statistics and the like. In some embodiments, the web crawler may be configured to determine the relevancy of a data pattern. Relevancy may be determined by a relevancy score. A relevancy score may be automatically generated by computing device 108, received from a machine learning model, and/or received from the user. In some embodiments, a relevancy score may include a range of numerical values that may correspond to a relevancy strength of data received from a web crawler function.

Still referring to the FIG. 1, computing device 108 is configured to classify user data 112 to a service type. A "service type," as used herein, is a type of service or good a matched with a user. Computing device 108 may classify a user to relevant service and products provided by a business based on the user data 112 and system data 116. In some embodiments, computing device may classify user data 112 to a service type based on data in user data 112 indicating that user has engaged in that service type. For example, a user may be classified to type of car wash service based on the model and make of the user's car, frequency of washes a user has purchased in the past, and the like. Computing device 108 may classify a user to a service type using a machine-learning model, such as a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 108 and/or another device may generate service type classifier 124 using a classification algorithm, defined as a processes whereby a computing device 108 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device may train a service type classifier 124 configured to receive user data 112 and output a service type. Service type training data may correlate user data to a service type. In some embodiments, a service type may be based service and products contained in system data. For example, a user's vehicle make and model may be correlated to preventive maintenance service or products a business provides. Computing device may train a system classifier 128 configured classify a user out of a plurality of users in user data 112 to a particular business out of a plurality of businesses in system data 116. System classifier 128 may be configured to receive service types outputted by service type classier as an inputs and output out a plurality of user profiles. A "user profile," as used herein, is a data structure containing a user identification matched to a relevant business. Relevancy may be based of similar geolocations, of a business and user, business hours, business availability, services offered match user vehicle information, frequency of visits a user make to a business, and the like. System classifier 128 may be trained with a system training data set correlating user data to system data. System training may also include restrictions received from a user or business. For example, restrictions may include excluding business over 50 miles from the user, excluding business closed on Sundays, excluding users with a certain type of vehicle and the like. System training may also include incentives received from a user or business. For example, deeming relevant business that take online appointments, business open late night, users with modern cars, and the like. User profile 132 may include a user service type, as in the type of service provided by a business most relevant to a user. User profile 132 may include types of services used by users, shops mostly used by user, geolocation of shops used by user, shops located within a set radius from user's geolocation, and the like.

Still referring to FIG. 1, computing device 108 may be configured to generate classifiers as used in this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 108 may then calculate a likelihood table by calculating probabilities of different data entries and classification labels. Computing device 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 108 may be configured to generate classifiers as used in this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2}$$

where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device 108 is configured to generate a pecuniary adjustment assessment 136 as a function of the classified user data 112 and system data 116. A "pecuniary adjustment assessment," as used herein, is a change in price for a service or good. Pecuniary adjustment assessment 136 may be a specific assessment for a single user or a single business or a general assessment based on a plurality of users or plurality of businesses. Pecuniary adjustment assessment 136 may include a change in prices for goods and services for all shops belonging to a business based on user data 112 of one or more users, economic conditions, holidays, and the like. Pecuniary adjustment assessment 136 may include separate price adjustments 136 for each shop belonging to a business based on user data 112 of one or more users. Pecuniary adjustment assessment 136 may include a projection of user's future needs based on user data 112. Projection of user's future needs may be generated using user profile 132. In some embodiments, user data 112 and user profile 132 may include results from survey responses about a business received from a user.

Still referring to FIG. 1, computing device 108 may generate a pecuniary adjustment assessment 136 utilizing one or more machine-learning models. Computer device may train and utilize a price assessment machine-learning model 140 to output a price adjustment 144. A "price assessment machine-learning model," as used herein, is a machine-learning model configured to calculate a price adjustment 144. Price assessment machine-learning model 140 may include a linear regression model. Price assessment machine-learning model 140 may include any machine-learning algorithm as described throughout this disclosure. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, price assessment machine-learning model 140 may receive user profiles 124, user data 112, cluster data 120, system data 116 as inputs and output a price adjustment 136. A "price adjustment," as used herein, is change in price for a service or good. For example, a price adjustment 144 may be a monetary change in price for a basic car wash from $12 to $16. Price adjustments 136 may be based on a plurality of trends identified by the machine-learning model or computing device 108. For example, trends may include the least to most popular services and/or good purchased among user, most costly service and/or good correlated to an inflation rate, price difference for a service and/or good among a plurality of states, business gross revue compared to business debt, and the like. Computing device may train an economic trend machine-learning model configured to receive cluster data 120 and system 116 as include and out trends as described above. Economic trend training data may include system data correlated to cluster data 120. For example, the demand in oil changes correlated to an increase in economic value. Price assessment machine-learning model 140 may additionally receive trend outputs of economic trend machine-learning model as input. Price assessment machine-learning model 140 my be trained using a price assessment training data set. Price assessment training data may correlate a service and/or good of a business to financial statistics, such as inflation rates, and the like. Price assessment training data may include trends as described above. Price assessment training data may include price historical data. "Price historical data," as used herein, is information related to past prices and change in prices for a service or good. For example, price historical data may include past prices of one or more businesses for a car wash service. In some embodiments, historical data may include dependent factors that lead to past price changes, for example, a recession, inflation rate, pandemic, and the like. Price assessment training data may correlate user profile 132, user data 112, and/or system data 116 to trends and or price historical data as described above.

Still referring to FIG .1, computing device 108 may train and utilize a Projection machine-learning model 148 to output a user projection 152. A "projection machine-learning model," as used herein, is a machine-learning model configured to generate a user projection 152. A "user projection," as used herein, is predicated services and goods a user may request in the future. For example, a user projection 152 may be a type of car wash service a user is likely to purchase next when that user visits a business location. A user projection 152 may relate to a plurality of users, for example, a user projection 152 may be a service type most likely to be purchased by a plurality of users. Projection machine-learning model 148 may include machine-learning models as described through this disclosure. Projection machine-learning model 148 may be configured to receive a user profile 132 and/or user data 112 as inputs and output the user projection 152. Projection machine-learning model 148 may be trained utilizing a projection training data set. In some embodiments, a projection training data set may correlate a user profile 132 and/or user data 112 to a projected service and/or projected product type. In some embodiments, projection data may include service and/or product sale trends identified in system data 116. For example, the most popular car wash service offered by a business based on sales. In some embodiments, user projection 152 may be retroactively used as an input of training data to economic trend machine-learning model or price assessment machine-learning model 140. For example, if many users are projected to purchase a service from a business or patronize that business, then prices may be projected to be increased based on this economic trend.

Still referring to FIG. 1, in an embodiment, a price adjustment may be targeted to a single or particular type of user. For example, the price adjustment may additionally be based on a user class, such as, loyalty rewards member. User classes may be based on the need or qualifications of a user. For example, a first-time user, a user serving in the military, a user needing urgent service, a routine user, a sporadic user, and the like. A price adjustment may depend on the weight of the user class, for example, a loyalty member may receive lower rates than a walk-in user. In another example, if a user owns a Rolls Royce as opposed to a Toyota Corolla, the user may be charged more for a service. Conversely, if a sporadic user is requiring a preventative service, then the price may be lower. Computing device may use a fuzzy set inference system to make such weighted determinations. For example, a business may have a user class criteria outlining key elements or qualifications that may qualify a user for a specific discount in a priced adjustment, such as service type, user data, economic trends, and the like. Each user class criterion may be used in fuzzy sets to compare against a user profile fuzzy set as described further below.

Still referring to FIG. 1, computing device 108 is configured to output pecuniary adjustment assessment 136. Outputting pecuniary adjustment assessment 136 may include displaying through a GUI or user interface as described above. In some embodiments, outputting pecuniary adjustment assessment 136 may include transmitting pecuniary adjustment assessment 136 to a remote device. In some embodiments, computing device 108 may be configured to transmit a pecuniary notification, which may include a promotional price list, to a client device as a function of the pecuniary adjustment assessment 136. For example, promotional price list may include a text message to a customer that includes adjusted prices for services previously used by customer based on the pecuniary adjustment assessment 136 and the user data 112. A "pecuniary notification," as used herein, is a data structure containing price adjustments 136. In some embodiments, Computing device 108 may generate the promotional price list by identifying price adjustments 136 in pecuniary adjustment assessment 136 that benefit a user. For example, a price adjustment 144 changing the price of a $25 deluxe car wash to $20.

Figure 2:
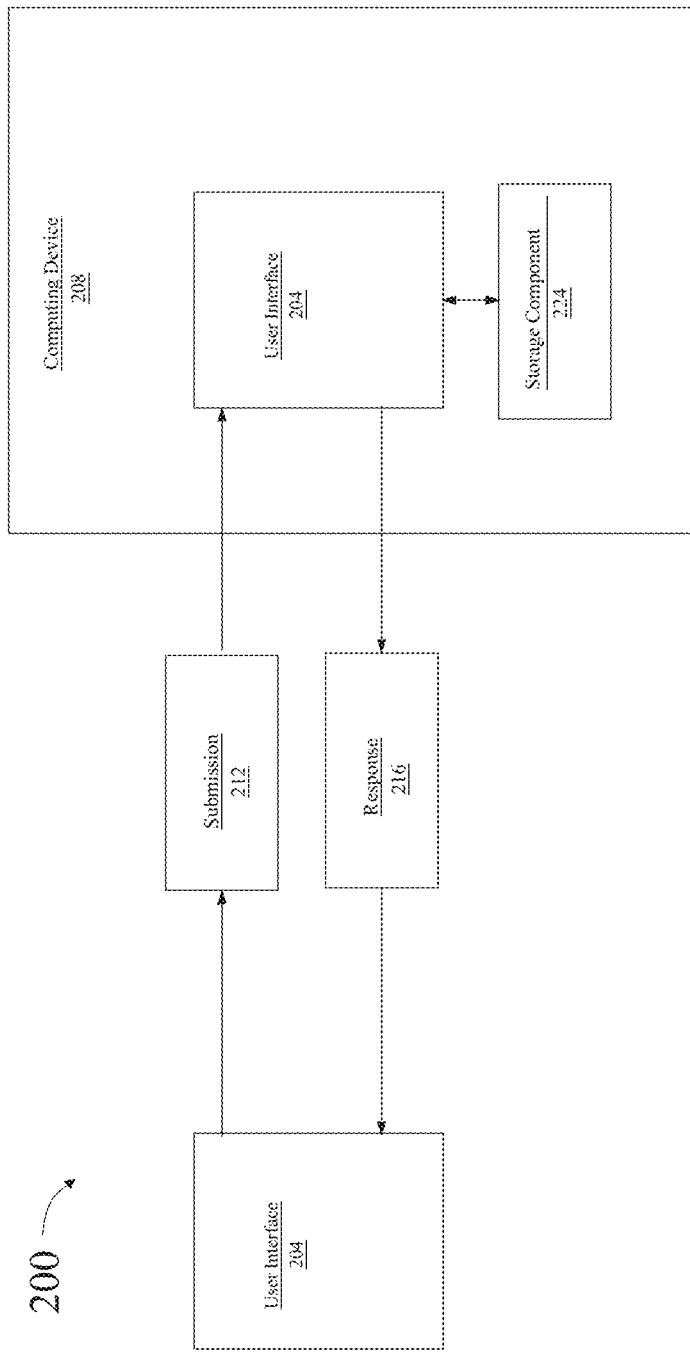
FIG. 2 is a block diagram illustrating a Chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 108 as an input to another function, such as machine-learning models as described further below.

Figure 3:
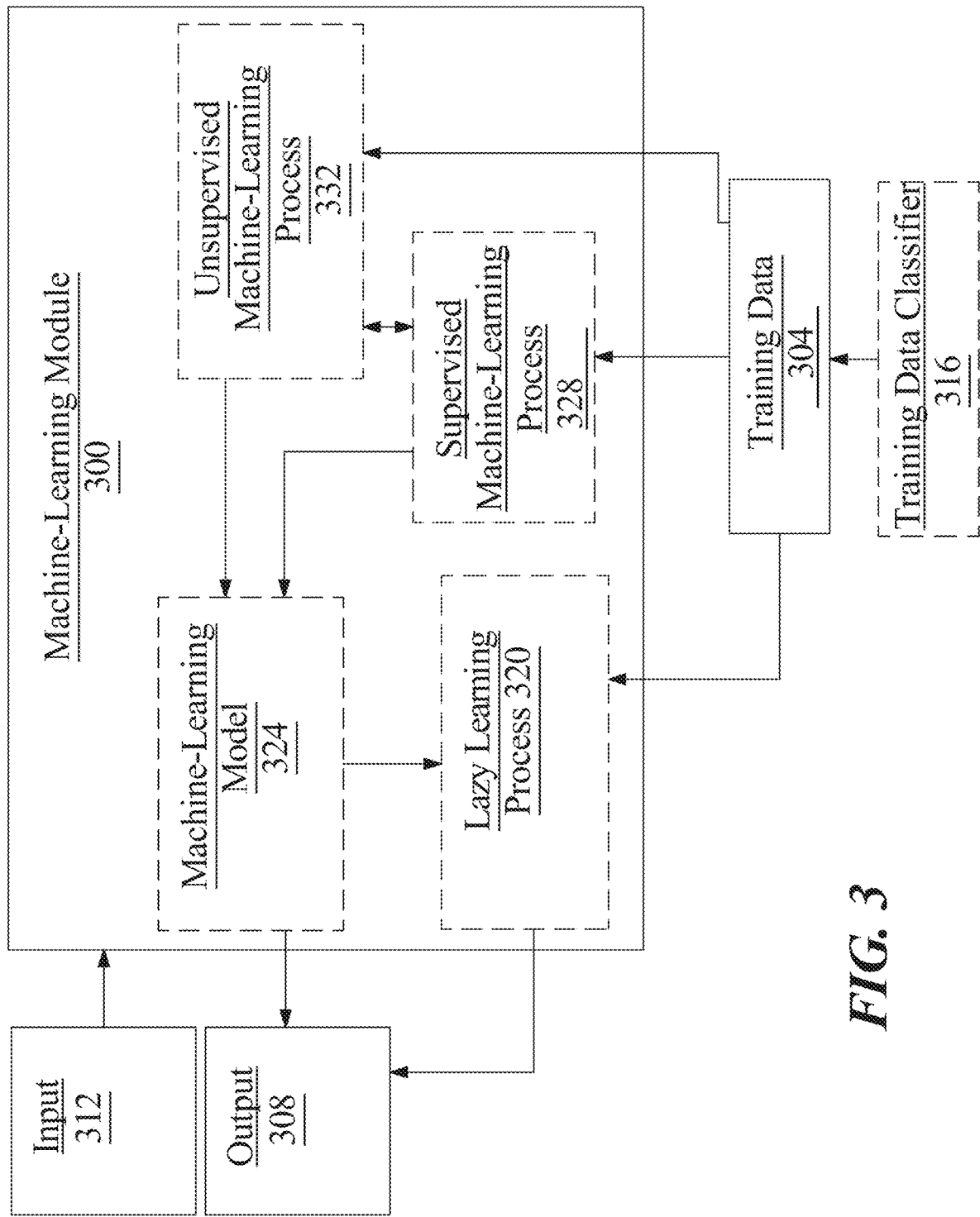
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
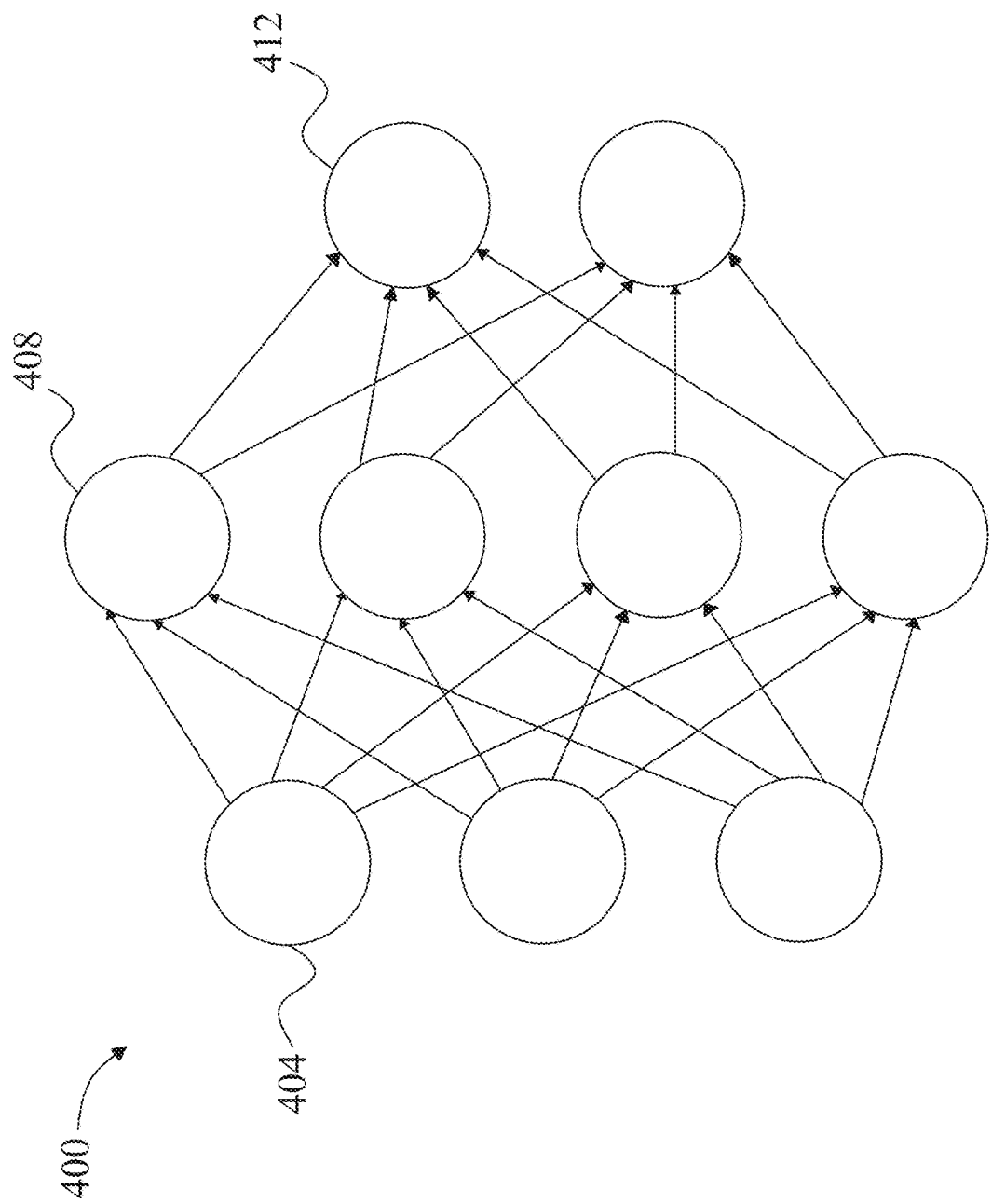
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
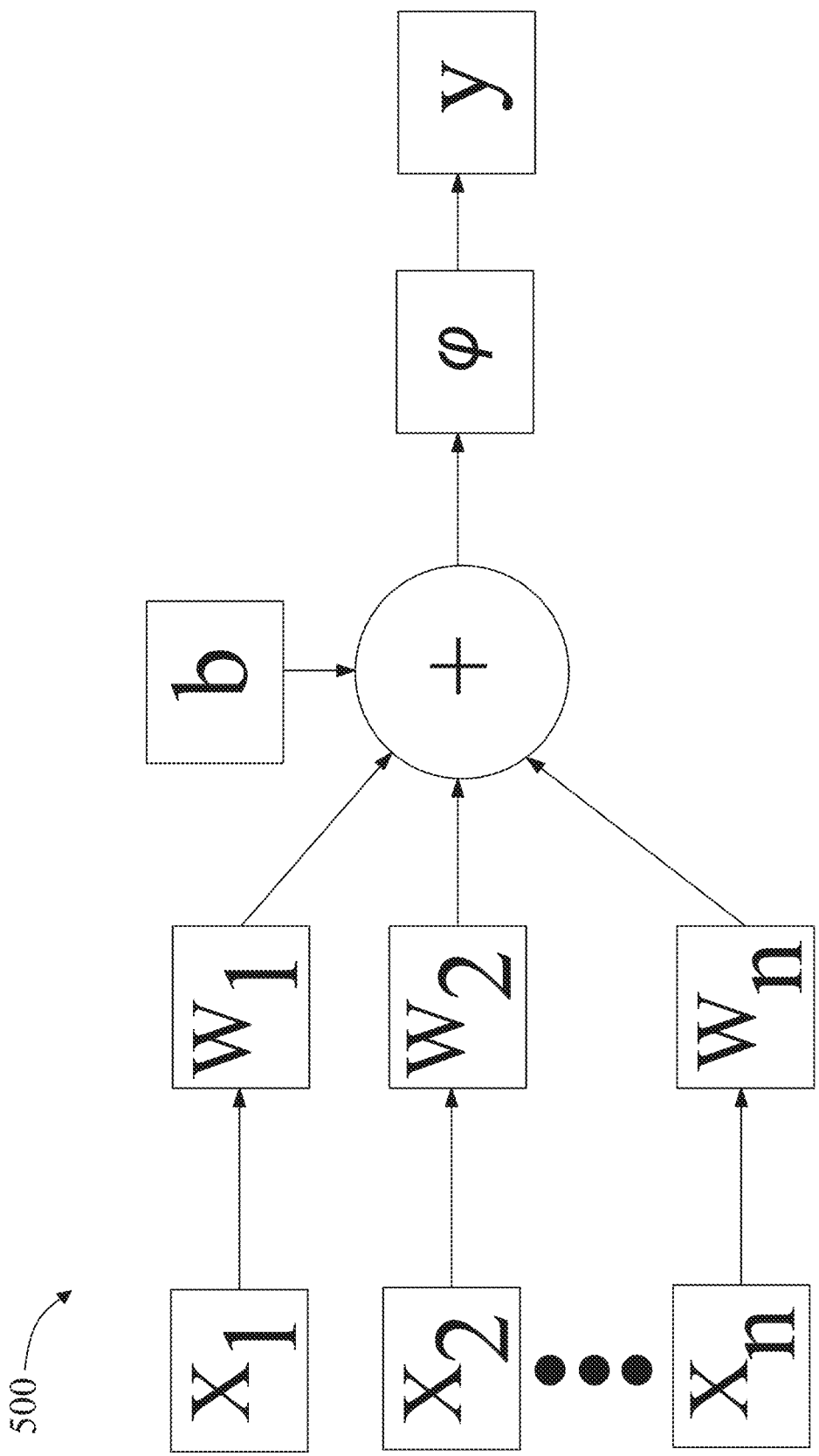
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function Φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
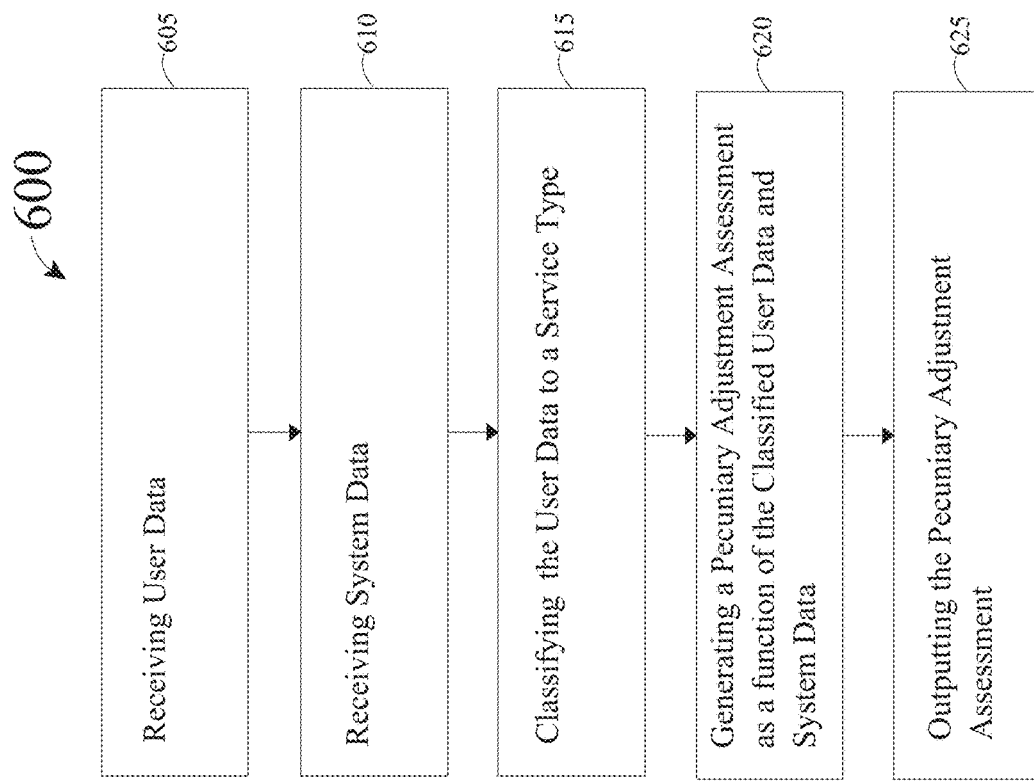
FIG. 6 is a flow diagram illustrating an exemplary method for profile assessment.

Referring now to FIG. 6, an exemplary flow diagram of a of a method 600 for profile assessment is illustrated. At step 605, method 600 includes receiving, by a computing device, user data, for example, and as implemented in FIGS. 1-5. User data may include a user's name correlated to a activity record. User data may include geolocation. User data may include vehicle data. Vehicle data may include a historical record of a vehicle. At step 610, method 600 includes receiving, by the computing device, system data, for example, and as implemented in FIGS. 1-5. System data may include economic information. System data may include price historical data. At step 615, method 600 includes classifying, by the computing device, the user data to a service type, for example, and as implemented in FIGS. 1-5. Classifying the user data to a service type may include receiving a service type training data set, training a machine-learning model as a function of the service type training data and outputting, by the machine-learning model, a user service type. At step 620, method 600 includes generating, by the computing device, a pecuniary adjustment assessment as a function of the classified user data and system data, for example, and as implemented in FIGS. 1-5. Generating the pecuniary adjustment assessment may include receiving a projection training data set, training a machine-learning model as a function of the projection training data, and outputting, by the machine-learning model, a user projection. At step 625 method 600 includes outputting, by the computing device, the pecuniary adjustment assessment, for example, and as implemented in FIGS. 1-5.

Figure 7:
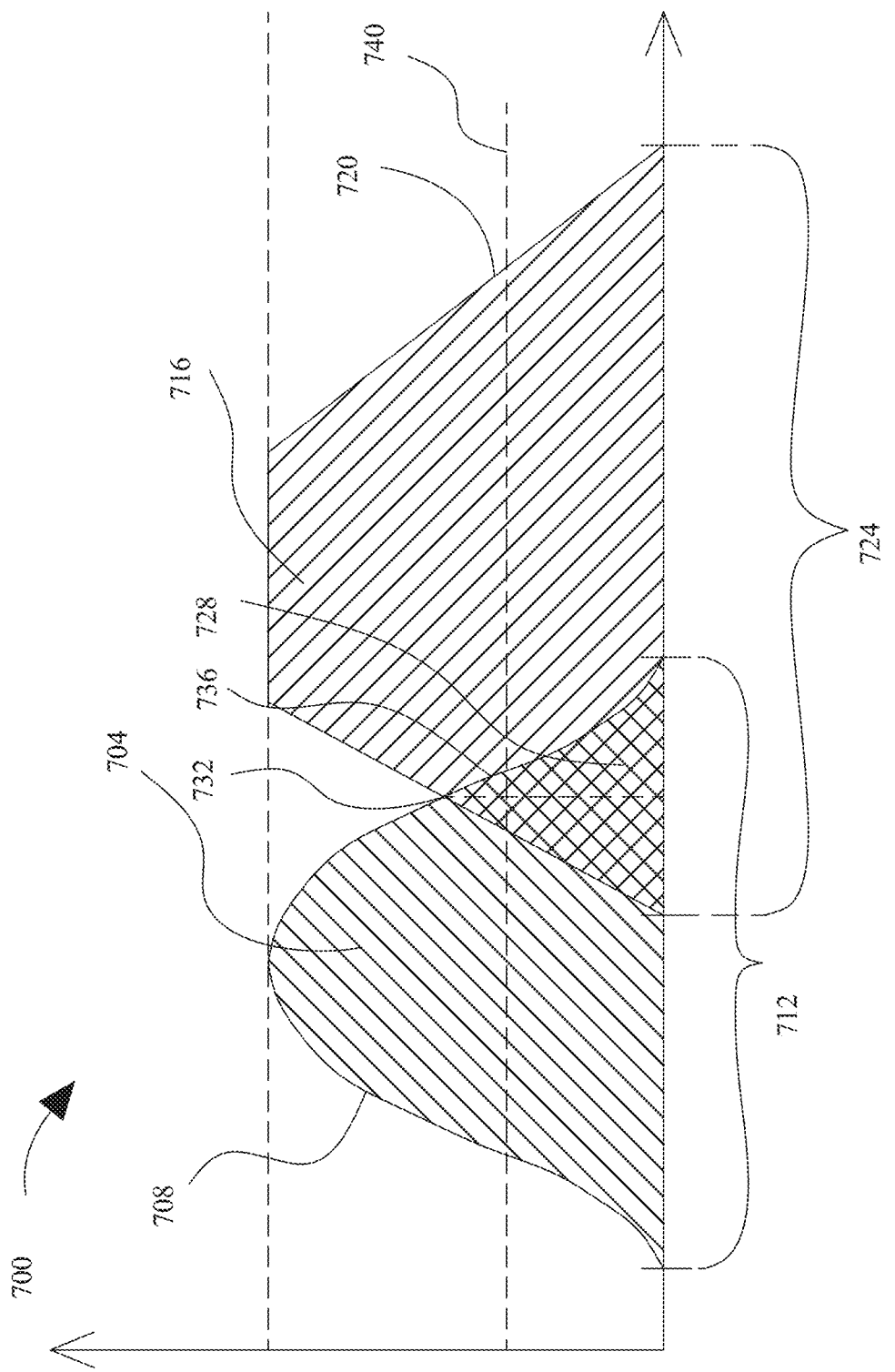
FIG. 7 is a diagram of an of fuzzy set comparison.

Referring to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0, 1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models, user profile, and a predetermined class, such as without limitation of user class A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or user profile and a predetermined class, such as without limitation user class categorization, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify a user profile with user class. For instance, if a user class has a fuzzy set matching user profile fuzzy set by having a degree of overlap exceeding a threshold, computing device 108 may classify the user profile as belonging to the user class categorization. Where multiple fuzzy matches are performed, degrees of match for each respective fuzzy set may be computed and aggregated through, for instance, addition, averaging, or the like, to determine an overall degree of match.

Still referring to FIG. 7, in an embodiment, a user profile may be compared to multiple user class categorization fuzzy sets. For instance, user profile may be represented by a fuzzy set that is compared to each of the multiple user class categorization fuzzy sets; and a degree of overlap exceeding a threshold between the user profile fuzzy set and any of the multiple user class categorization fuzzy sets may cause computing device 108 to classify the user profile as belonging to user class categorization. For instance, in one embodiment there may be two user class categorization fuzzy sets, representing respectively loyal (first) user class categorization and an sporadic (second) user class categorization. First user class categorization may have a first fuzzy set; Second user class categorization may have a second fuzzy set; and user profile may have an user profile fuzzy set. computing device 108, for example, may compare an user profile fuzzy set with each of user class categorization fuzzy set and in user class categorization fuzzy set, as described above, and classify a user profile to either, both, or neither of user class categorization or in user class categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, user profile may be used indirectly to determine a fuzzy set, as user profile fuzzy set may be derived from outputs of one or more machine-learning models that take the user profile directly or indirectly as inputs.

Still referring to FIG. 7, a computing device may use a logic comparison program, such as, but not limited to, a fuzzy logic model to determine a user class response. An user class response may include, but is not limited to, qualified, disqualified, and the like; each such user class response may be represented as a value for a linguistic variable representing user class response or in other words a fuzzy set as described above that corresponds to a degree of match as calculated using any statistical, machine-learning, or other method that may occur to a person skilled in the art upon reviewing the entirety of this disclosure. In other words, a given element of user profile may have a first non-zero value for membership in a first linguistic variable value such as "user visits" and a second non-zero value for membership in a second linguistic variable value such as "vehicle type" In some embodiments, determining a user class categorization may include using a linear regression model. A linear regression model may include a machine learning model. A linear regression model may be configured to map data of user profile, such as degree of match to one or more user class parameters. A linear regression model may be trained using a machine learning process. A linear regression model may map statistics such as, but not limited to, quality of user profile. In some embodiments, determining a user class of user profile may include using a user class classification model. A user class classification model may be configured to input collected data and cluster data to a centroid based on, but not limited to, frequency of appearance, linguistic indicators of quality, and the like. Centroids may include scores assigned to them such that quality of match of user profile may each be assigned a score. In some embodiments user class classification model may include a K-means clustering model. In some embodiments, user class classification model may include a particle swarm optimization model. In some embodiments, determining the user class of a user profile may include using a fuzzy inference engine. A fuzzy inference engine may be configured to map one or more user profile data elements using fuzzy logic. In some embodiments, user profile may be arranged by a logic comparison program into user class arrangement. An "user class arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given match level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 7, an inference engine may be implemented according to input and/or output membership functions and/or linguistic variables. For instance, a first linguistic variable may represent a first measurable value pertaining to user profile, such as a degree of match of an element, while a second membership function may indicate a degree of in mismatch user class of a subject thereof, or another measurable value pertaining to user profile. Continuing the example, an output linguistic variable may represent, without limitation, a score value. An inference engine may combine rules, such as: "if the user visits level is 'high' and the service urgency level is 'low', the match score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity:(T(a, b)≤T (c, d) if a≤c and b≤d), (associativity:T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b-a*b), bounded sum, and/or drastic T-conorm; any T-conorm may be used that satisfies the properties of commutativity: ⊥(a, b)=⊥(b, a), monotonicity:⊥(a, b)≤⊥(c, d) if a≤c and b≤d, associativity:⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
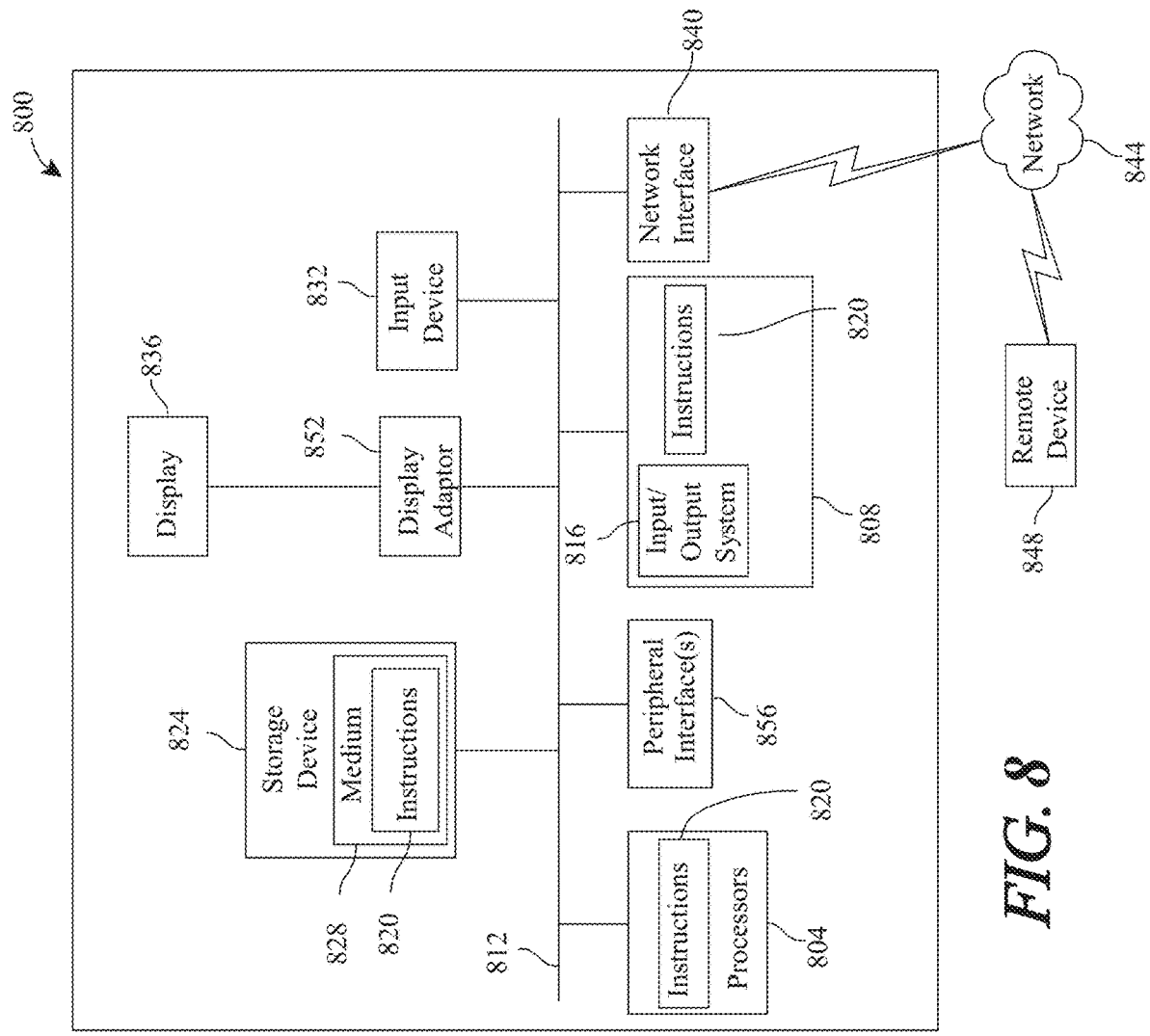
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for profile assessment, the apparatus comprising:
   at least a processor; and
   a memory communicatively connected to the processor, the memory containing instructions configuring the processor to:
   receive user data from at least a chatbot;
   receive system data;
   receive cluster data;
   generate at least a trend as a function of the system data and the cluster data;
   classify the user data to a service type;
   generate a pecuniary adjustment assessment as a function of the classified user data, the at least a trend, and the system data, wherein generating the pecuniary adjustment assessment comprises:
      determining a user projection, wherein determining the user projection comprises:
         receiving a projection training data set correlating user profiles to projected service types;
         training a machine-learning model as a function of the projection training data set; and
         outputting, by the machine-learning model, the user projection; and
      generating a price adjustment as a function of the at least a trend; and
   output the pecuniary adjustment assessment.

2. The apparatus of claim 1, wherein the user data comprises a user's name correlated to an activity record.

3. The apparatus of claim 1, wherein the user data comprises geolocation data.

4. The apparatus of claim 1, wherein the user data comprises vehicle data.

5. The apparatus of claim 4, wherein the vehicle data comprises a historical report of a vehicle.

6. The apparatus of claim 1, wherein the system data comprises economic information.

7. The apparatus of claim 1, wherein the system data comprises price historical data.

8. The apparatus of claim 1, wherein classifying the user data to a service type comprises:
   receiving a service type training data set correlating a plurality of user data to a plurality of service types;
   training a machine-learning model as a function of the service type training data set; and
   outputting, by the machine-learning model, a service type.

9. The apparatus of claim 1, wherein outputting the pecuniary adjustment assessment comprises transmitting a pecuniary notification to a remote computing device.

10. The apparatus of claim 1, wherein the processor is further configured to generate the at least a trend as a function of an economic trend machine-learning model, wherein generating the at least a trend comprises:
    training the economic trend machine learning model using economic trend training data; and
    outputting the at least a trend using the trained economic trend machine learning model, wherein the trained machine learning model is configured to receive the system data and the cluster data as inputs and output the at least a trend.

11. A method for profile assessment, the method comprising:
  receiving, by a computing device, user data from at least a chatbot;
  receiving, by the computing device, system data;
  receiving, by the computing device, cluster data;
  generating, by the computing device, at least a trend as a function of the system data and the cluster data;
  classifying, by the computing device, the user data to a service type;
  generating, by the computing device, a pecuniary adjustment assessment as a function of the classified user data, the at least a trend and the system data, wherein generating the pecuniary adjustment assessment comprises determining a user projection, wherein determining the user projection comprises:
    receiving a projection training data set correlating user profiles to projected service types;
    training a machine-learning model as a function of the projection training data set and
    outputting, by the machine-learning model, the user projection; and
  generating a price adjustment as a function of the at least a trend; and
  outputting, by the computing device, the pecuniary adjustment assessment.

12. The method of claim 11, wherein the user data comprises a user's name correlated to an activity record.

13. The method of claim 11, wherein the user data comprises geolocation.

14. The method of claim 11, wherein the user data comprises vehicle data.

15. The method of claim 14, wherein the vehicle data comprises a historical record of a vehicle.

16. The method of claim 11, wherein the system data comprises economic information.

17. The method of claim 11, wherein the system data comprises price historical data.

18. The method of claim 11, wherein classifying the user data to a service type comprises:
  receiving a service type training data set correlating a plurality of user data to a plurality of service types;
  training a machine-learning model as a function of the service type training data set; and
  outputting, by the machine-learning model, a service type.

19. The method of claim 11, wherein outputting the pecuniary adjustment assessment comprises transmitting a pecuniary notification to a remote computing device.

20. The method of claim 11, wherein the generating the at least a trend further comprises: training the economic trend machine learning model using economic trend training data; and
  outputting the at least a trend using the trained economic trend machine learning model, wherein the trained machine learning model is configured to receive the system data and the cluster data as inputs and output the at least a trend.

* * * * *